(12) United States Patent
Lucey et al.

(10) Patent No.: US 7,961,870 B2
(45) Date of Patent: Jun. 14, 2011

(54) WIRELESS REMOTE CONTROLLED HANDSET LIFTER SYSTEM USING MAGNETICALLY COUPLED RING DETECTION

(75) Inventors: Robert E. Lucey, Sudbury, MA (US); Joseph L. Freni, Jr., Hudson, NH (US); Stephen R. Lyman, Hudson, NH (US)

(73) Assignee: GN Netcom A/S (DK)

( * ) Notice: Subject to any disclaimer, the term of this patent is extended or adjusted under 35 U.S.C. 154(b) by 1026 days.

(21) Appl. No.: 11/760,191

(22) Filed: Jun. 8, 2007

(65) Prior Publication Data
US 2007/0230685 A1    Oct. 4, 2007

Related U.S. Application Data

(62) Division of application No. 10/336,914, filed on Jan. 6, 2003, now Pat. No. 7,577,249.

(51) Int. Cl.
*H04M 1/00* (2006.01)
*H04B 1/38* (2006.01)
(52) U.S. Cl. ............... 379/447; 379/388.02; 455/90.3
(58) Field of Classification Search ............ 379/388.02, 379/431, 447; 455/90.3
See application file for complete search history.

(56) References Cited

U.S. PATENT DOCUMENTS

| | | | |
|---|---|---|---|
| 3,838,219 A | 9/1974 | Mason | |
| 4,301,335 A | 11/1981 | Jucker et al. | |
| 5,157,672 A * | 10/1992 | Kondou et al. | 714/795 |
| D358,594 S | 5/1995 | Clour | |
| 5,732,355 A | 3/1998 | Lipp et al. | |
| 5,930,354 A | 7/1999 | Britto et al. | |
| 6,081,596 A | 6/2000 | Maxon et al. | |

FOREIGN PATENT DOCUMENTS

| | | |
|---|---|---|
| DE | 26 01 031 | 3/1977 |
| GB | 855 833 | 12/1960 |
| WO | WO 99/49642 | 3/1999 |

OTHER PUBLICATIONS

FR 1,336,109, M. Camille Lartigau, Brevet D'Invention, Jul. 22, 1963.

* cited by examiner

*Primary Examiner* — Rasha S Al Aubaidi
(74) *Attorney, Agent, or Firm* — Altera Law Group, LLC

(57) ABSTRACT

An automatic handset lifter is used with a wireless communication system. The system attaches to a conventional telephone and creates a communication link between the telephone and a portable device such as a wireless headset. The system automatically detects the ringing of the telephone by sensing magnetic fields of the telephone speaker. Upon ring detection, the system creates a communications link with the remote device and deploys a mechanical lifting device to lift the handset. Lifting the handset activates the telephone cradle switch to answer the phone and thereby allows the remote device to communicate over the telephone.

9 Claims, 12 Drawing Sheets

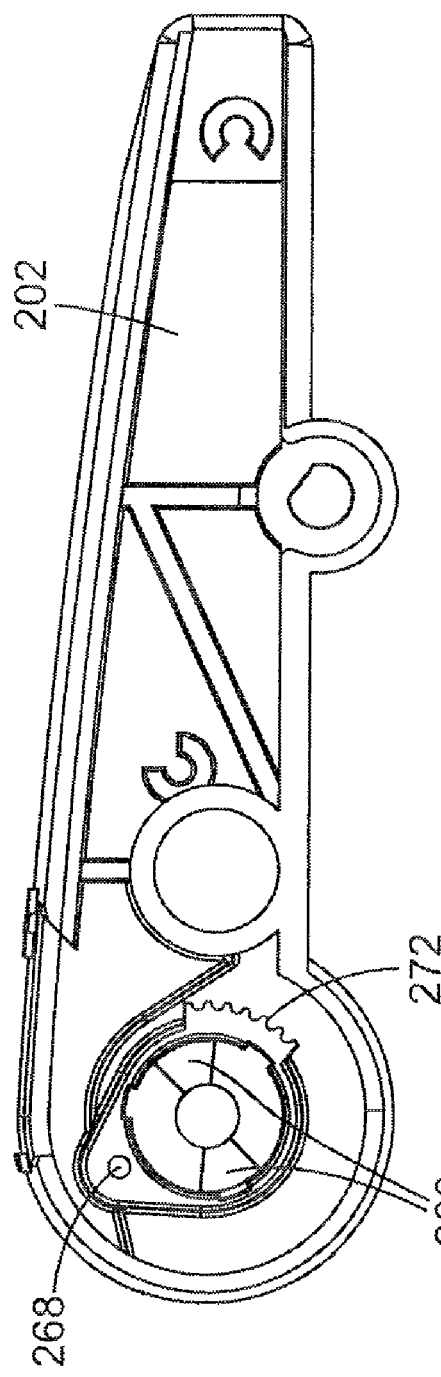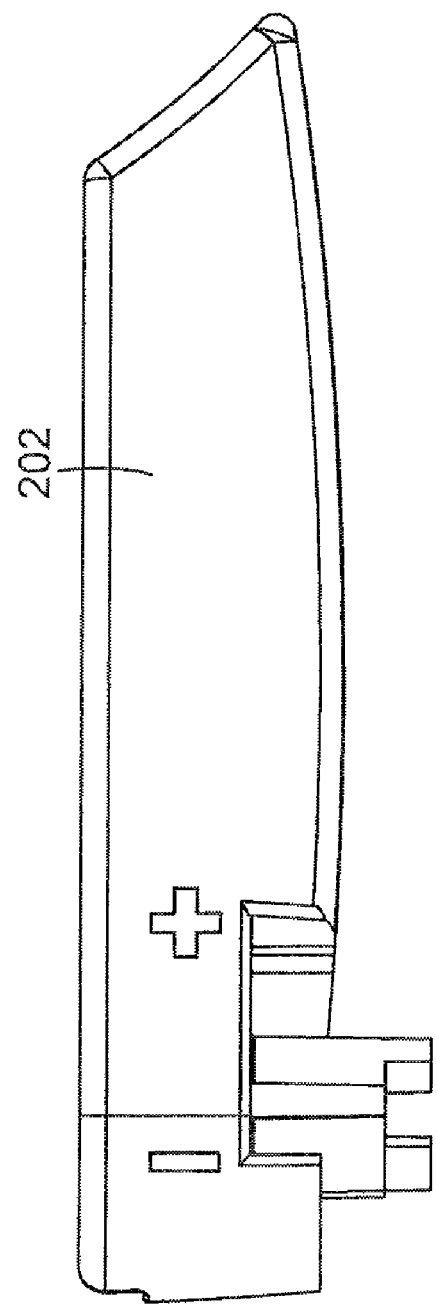

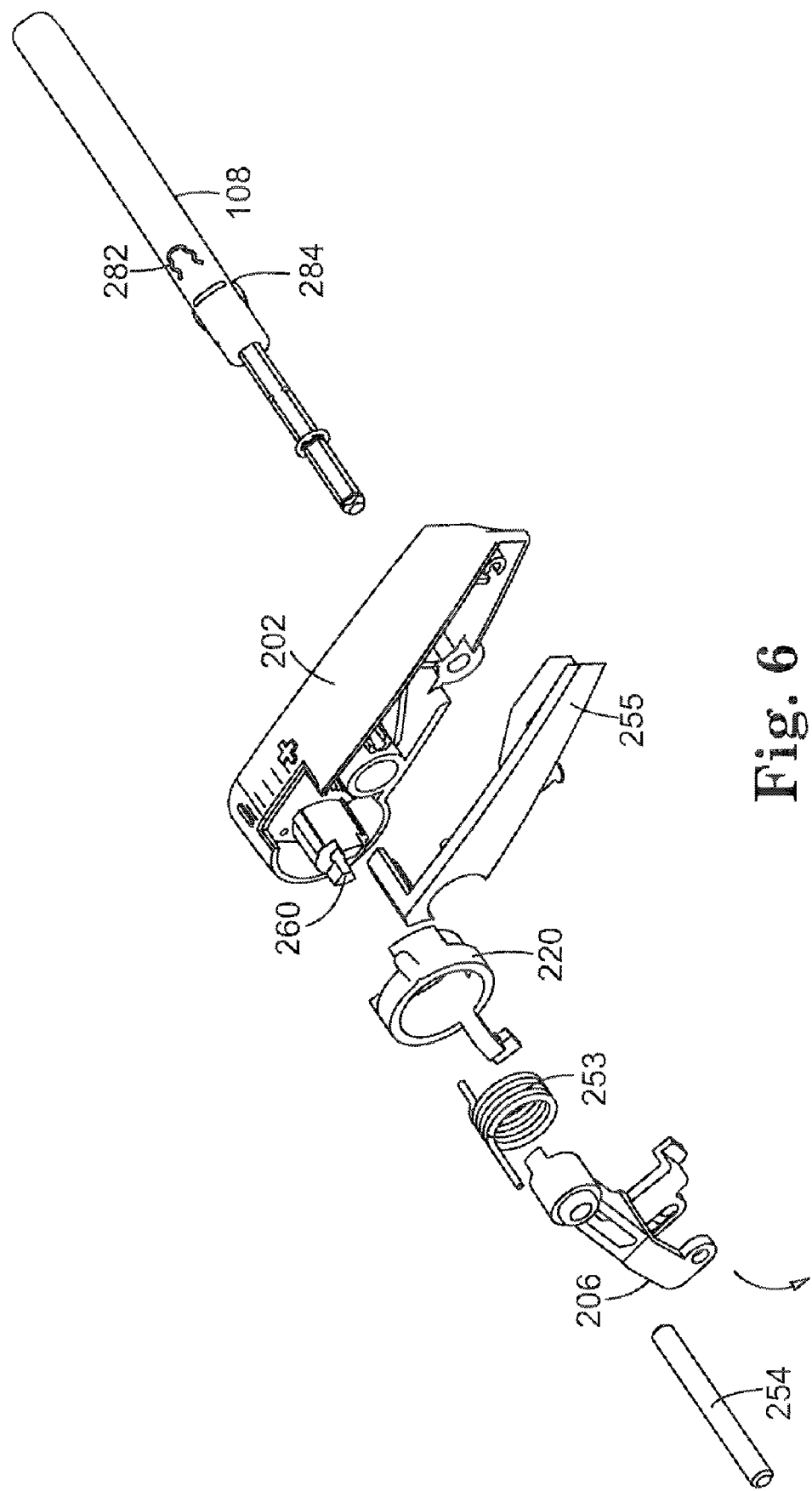

WIRELESS REMOTE CONTROLLED HANDSET LIFTER SYSTEM USING MAGNETICALLY COUPLED RING DETECTION

This application is a divisional of application ser. No. 10/336,914, filed 6 Jan. 2003 now U.S. Pat. No. 7,577,249. The application is incorporated herein by reference.

FIELD OF THE INVENTION

The present invention relates to telephone apparatus, in particular to an apparatus for remotely communicating with a standard telephone.

BACKGROUND OF THE INVENTION

Certain remote communication devices exist which are designed to interface with conventional telephone apparatus. One example of these devices includes wireless headsets that allow the user to answer calls without the user being located proximate the telephone.

Because there are a wide variety of phone standards, it would be cost prohibitive to make a wireless headset that can communicate with any given phone system. Furthermore, the phone set manufacturers would probably change their codes to keep from having second source products function with their stations. This is especially true in office environments, which are increasing using digital phone systems. Therefore, for maximum usefulness, such wireless headsets are designed to interface with the audio portion of the signal, i.e. at the handset, and thereby be compatible with a wide variety of phone systems.

Such wireless systems typically include a base station inserted between the handset and the telephone itself, in effect tapping off the audio signals for transmission to and from the headset. Because the handset remains indirectly connected to the telephone via the wireless base that may contain switching circuits for selecting wireless headset or headset, the user still retains the ability to use the both original handset and the wireless device.

In many cases, the user will be located near the telephone set (e.g. to make outgoing call from the telephone keypad), in which case the user could manually lift the handset to initiate the phone call. However, this may be an inconvenience, as it also requires the user to manually replace the handset at the end of the call.

Some systems use a lifting device that is manually activated by the user. However, it is more desirable to allow the user to automatically answer the telephone without having to personally remove the handset, thereby providing greater convenience. Automatic lifting of the handset also allows the user to answer calls while roaming wirelessly away from the telephone base. Such wireless headset systems, therefore, typically use an automatic lifting device.

To allow roaming of the user, the headset lifting system needs to detect when the telephone is ringing in order to make it practical to use a wireless headset without the need to run back to the base station to lift the handset to the "off hook" position. Typically, such a system allows the user to remotely initiate lifting of the handset and thereby answering the call.

Some systems for detecting calls and remotely lifting handsets are known, however they tend to be bulky and not easily positioned. To detect calls, some systems utilize a microphone mounted near a telephone speaker. This approach can suffer from false ring detection due to ambient noise and/or adjacent telephones.

What is needed in the art is a system for remotely communicating with a standard telephone that is compact and easily attached. Further needed is a system that can detect the ringing of the telephone that is not susceptible to false ring detection due to surrounding noise. The present invention fulfills these and other needs, and addresses other deficiencies of prior art implementations.

SUMMARY OF THE INVENTION

To overcome the limitations in the prior art described above, and to overcome other limitations that will become apparent upon reading and understanding the present specification, the present invention discloses a system for establishing a remote communication link to a base telephone having a ring-sound transducer a handset and an off-hook switch activated by the proximity of the handset, the system comprising a remote communication unit. The unit may have a remote communicator for sending and receiving data, a remote ring indicator for alerting a user that a call has been received at the base telephone; and a remote answering activator for allowing the user to send an answer signal from the remote communication means. It may also have a base unit at least in part positionable adjacent to the telephone, which itself may a sensor positioned to be capable of detecting magnetic flux of the ring-sound transducer, a lifter mechanism for lifting the telephone handset to activate a cradle switch of the telephone and change the telephone between on-hook and off-hook states, a base communicator for sending and receiving data between the telephone an the remote communicator, a signal generator circuitry for receiving a signal from said magnetic sensor responsive to a ringing signal in the base telephone and for identifying said signal as a ring announcing an incoming phone call and activating said remote ring indicator; and lifter circuitry, responsive to said remote answering activator to operate the lifter mechanism between on and off hook states.

The invention may have some or all of these components and may also be directed to several other configurations, such as a method (or circuitry for) detecting a ring signal on a telephone, an off hook lifter device which is less subject to false ring detection and immune to handset slamming damage.

The specifics of the invention are set forth in the claims appended hereto.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 4 is a side plan view of the lifter arm;

FIG. 5 is a top plan view of the lifter arm;

FIG. 6 is an exploded perspective of the lifter arm assembly;

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention involves a communications system allowing remote access to the voice (or any kind of data) signal from a standard office telephone. The system is designed to be compatible with a wide variety of commercially available telephones, regardless of any digital or proprietary connections the telephone may utilize. In one application, the communication system is used to connect the voice signal from the telephone to a wireless remote headset, allowing the user to remotely answer and/or terminate phone calls.

Figure 1:
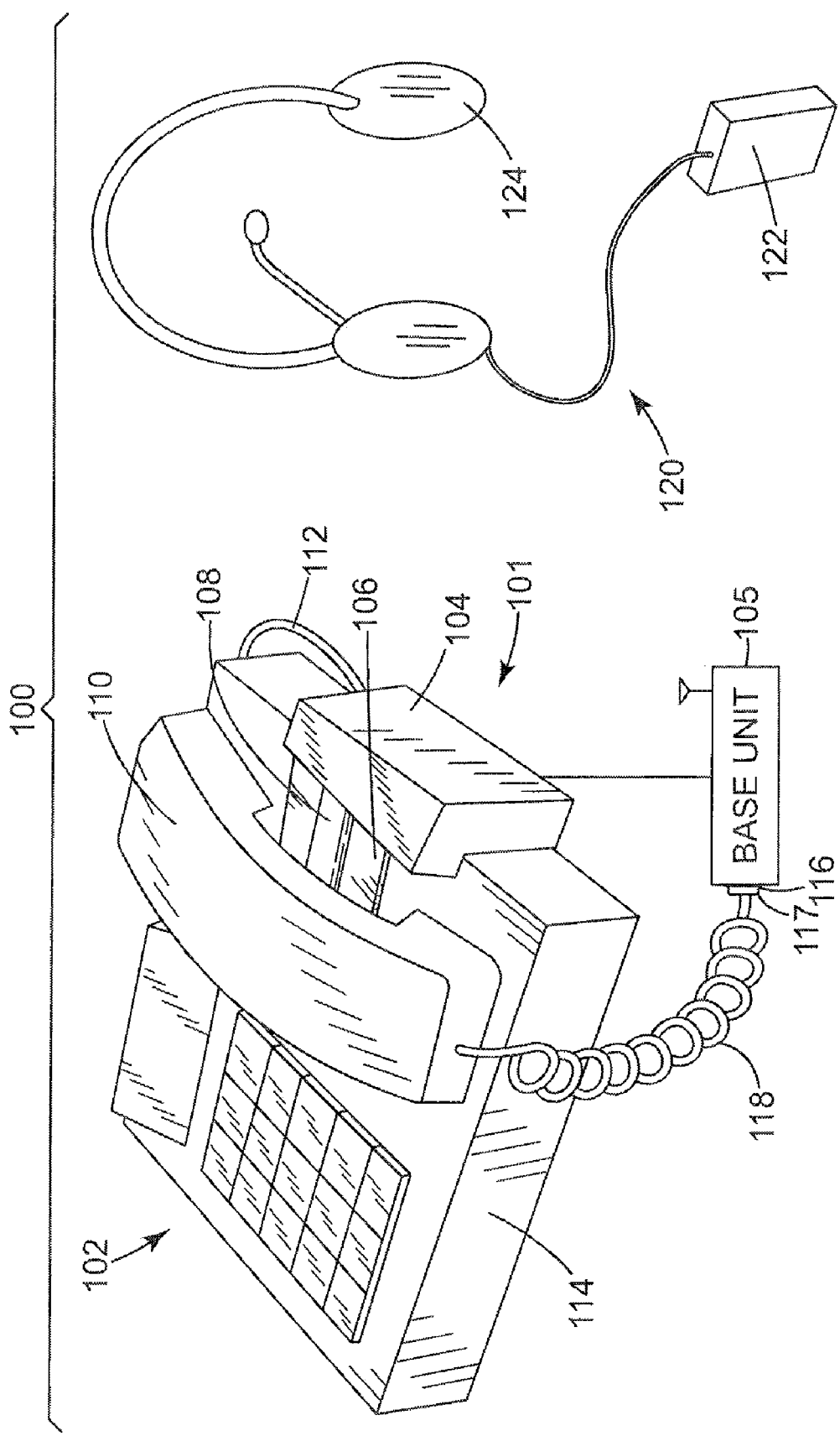
FIG. 1 is a perspective view of a system according to one embodiment of the present invention.

Referring now to FIG. 1, the remote communications system 100 includes a handset lifter 101 mounted to a standard office telephone 102. The handset lifter 101 includes a unit 104 that contains electronics and lifting mechanisms. A separate base unit 105, is preferred to a unitary unit in the housing for unit 104 because of placement flexibility and the ability of avoid the effects of spurious EMF or magnetic flux/fields emanating from telephone sets which are generally unshielded. A sensing plate (with opening for speaker audio to pass through) 106 extends from the lifter unit 104 and substantially covers the telephone speaker or other ring-sound transducer (not shown). A lifting member 108 extends over and substantially parallel to the sensing plate 106. The lifting member 108 can be automatically raised upon receipt of a call to lift the telephone handset 110 from the cradle. Lifting of the handset 110 releases a telephone cradle switch (not shown) and thereby connects the telephone 102 to a call in the usual fashion.

The base unit 105 includes an audio cable 112 designed to interface with a standard handset jack (e.g. RJ-14) located on the telephone base 114. The base unit 104 includes a connector 116 for receiving a plug 117 of the handset cable 118, thereby providing audio pass-though to allow normal operation of the telephone handset 110. Control cables between unites 104 and 105 are illustrated by a single lead line but may encompass any number of signal carriers. In a handset lifter 101 according to the present invention, an audio signal passing to the handset 110 can be tapped from the telephone 102 and transmitted to a remote unit 120. Because the handset audio signal is standard and well known, the system 100 according to the present invention can be used to provide a wireless communication link with a wide range of analog and digital telephone systems.

The remote communication unit 120 can remotely communicate with the handset lifter 101. The remote communication unit 120 can include a wireless transmitter and receiver 122 and a headset 124 as shown here. The wireless features can also be an integral part of the headset itself. It is appreciated that other forms of remote communication units 120 can be used in a system according to the present invention. For example, a remote communication unit 120 could be an automatic recording device, an answering machine, a computer for logging calls, a voice over IP device, an intercom system, a TDD Terminal (Telecommunications Device for the Deaf), etc.

Figure 2:
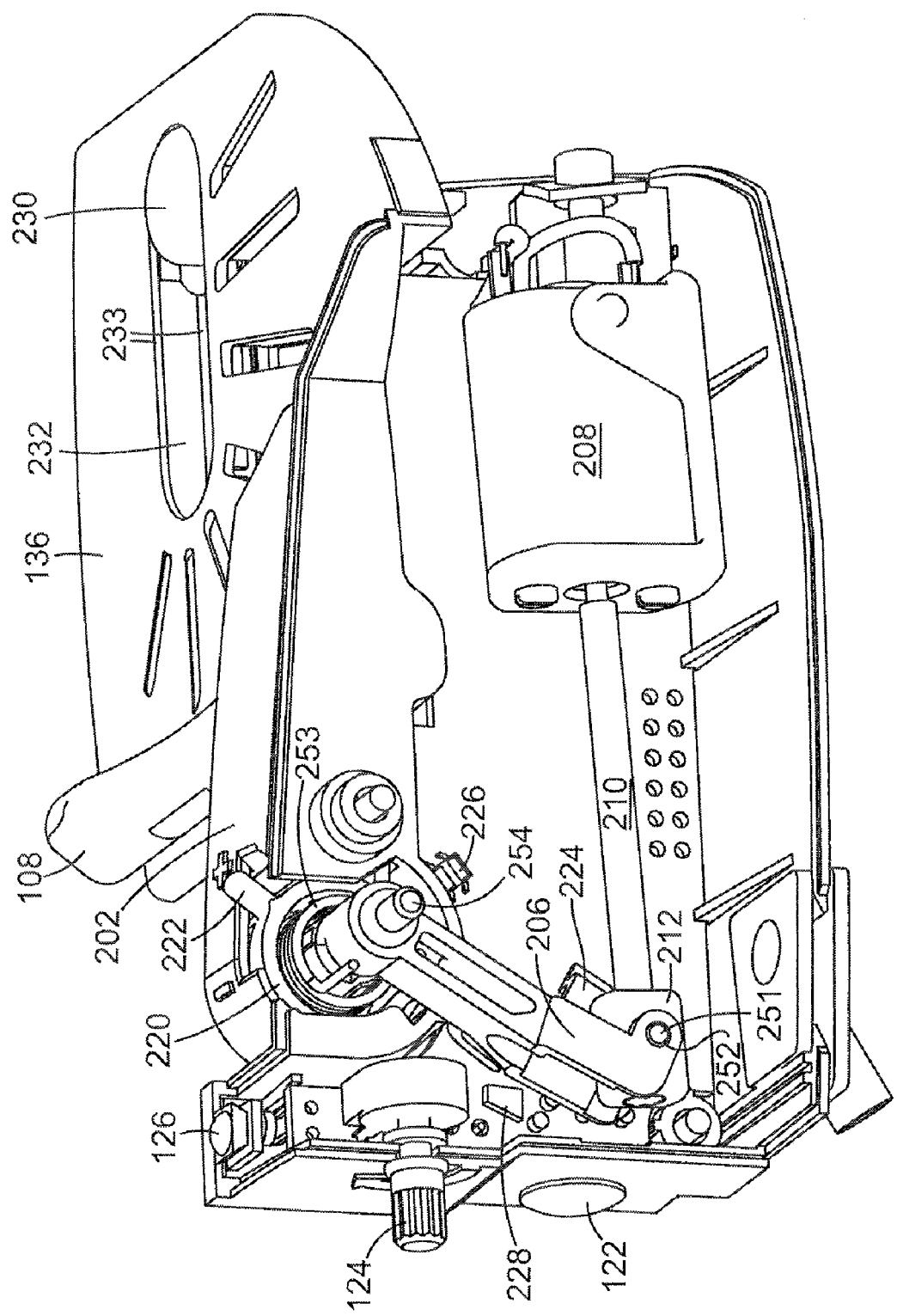
FIG. 2 is a perspective view of a handset lifting unit according to one embodiment of the present invention.
Figure 3:
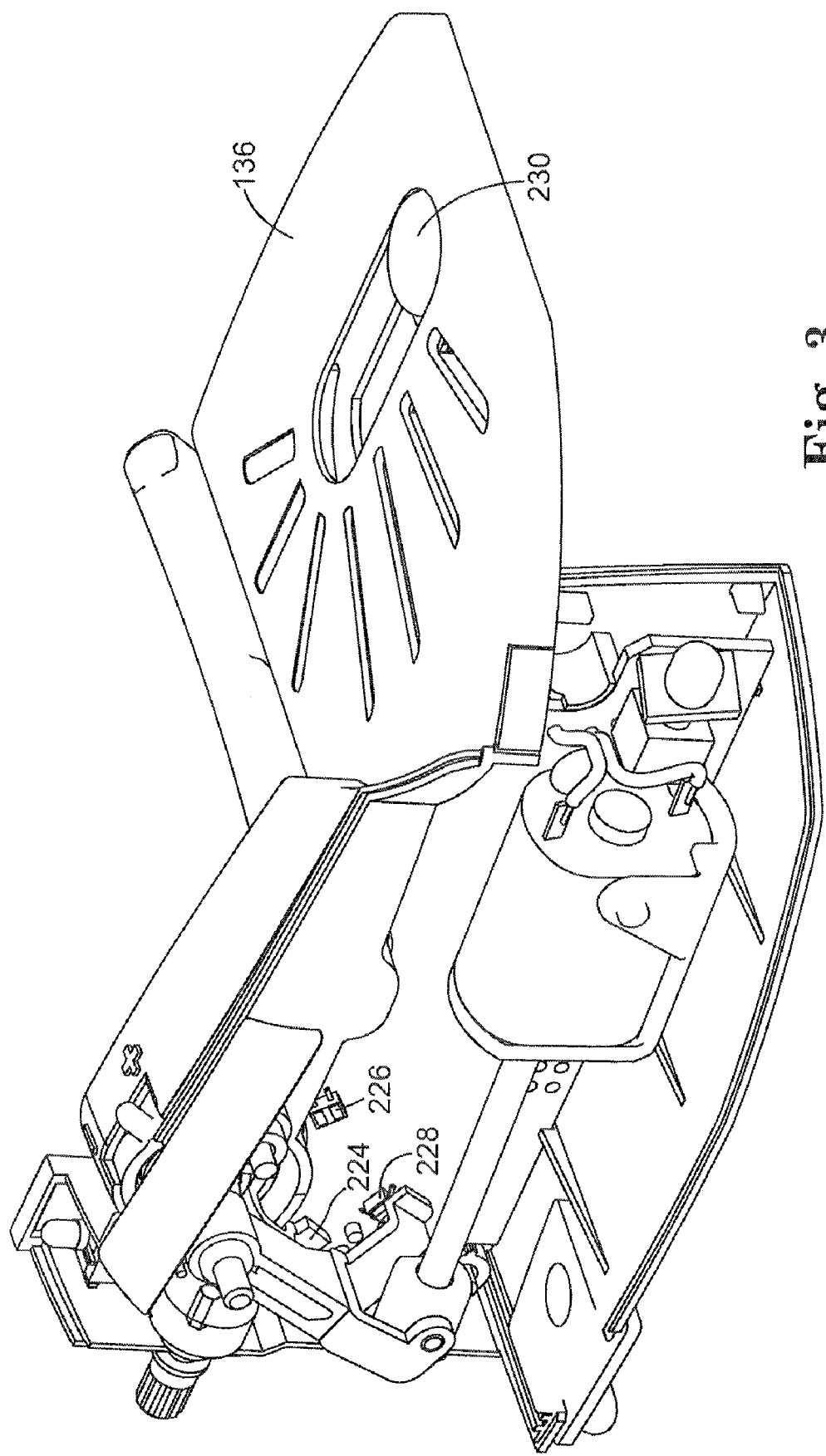
FIG. 3 is another perspective view of a handset lifting unit according to one embodiment of the present invention.

Further details of an exemplary handset lifter 101 are shown in FIG. 2. The lifting member 108 is attached to a lifting arm 202. The lifting arm 202 is rotatably attached to the base unit 104 at a bearing 254 for the torsion spring 253. A linkage 206 attaches the lifting arm 202 to a motor 208. The motor 208 can be a linear device, such as a solenoid, or a rotational motor. In this embodiment, the motor 208 has a rotating screw shaft 210 with a drive nut 212 mounted thereon. The drive nut 212 is pivotably coupled to the linkage 206. Rotation of the motor 208 causes linear motion of the drive nut 212 on the screw shaft 210, the drive nut 212 thereby causing rotation of the linkage 206 and lifting arm 202.

It is appreciated that alternate configurations of a drive mechanism for the lifting arm 202 can be used. For example, the motor 208 can be coupled to the lifting arm 202 by reduction gears, flexible drive shafts, belts, pulleys, magnetic clutches and other torque transmission devices known in the art.

A height selector (adjustment collar) 220 is frictionally coupled to the lifting arm 202. The adjustment collar 220 includes a adjustment tab 222 accessible from the exterior of the base unit 104 and a sensing arm 224. The sensing arm 224 moves between an up limit sensor 226 and a down limit sensor 228. The sensors 226, 228 detect when the sensing arm 224 is proximate. The sensors 226, 228 can include commercial proximity detection methods such as optical, magnetic, Hall effect, mechanical contact, etc.

The adjustment collar 220 is rotatably adjustable allowing the user to set a travel distance for the lifting arm 202 to fit a particular telephone's dimensions and lift the handset sufficiently to active "hook switch". [For example, the user can manually adjust the motor 208 until the lifting member 108 is touching just below the handset 110. The user can then rotate the adjustment collar 220 so that the sensing arm 224 is proximate the down limit sensor 228.] After this adjustment procedure, the lifting arm 202 and lifting member 108 will provide ample lifting of the handset 110 to ensure the cradle switch is disengaged when a call is received.

The lifter's structure and function are now provided in greater detail below. Lifter arm 202 is raised and lowered by a function of the linkage 206 which is drive by the combination of motor 208, shaft 210 and nut 212, which moves linkage 206 between limit positions defined by the limit sensors 226 and 228 and the sensing tab (arm) 224. To accommodate angular movement, linkage 206 pivots with respect to the nut 212 on pivot points 251 on the nut which mate with bearing holes 252 on the linkage.

Figure 7:
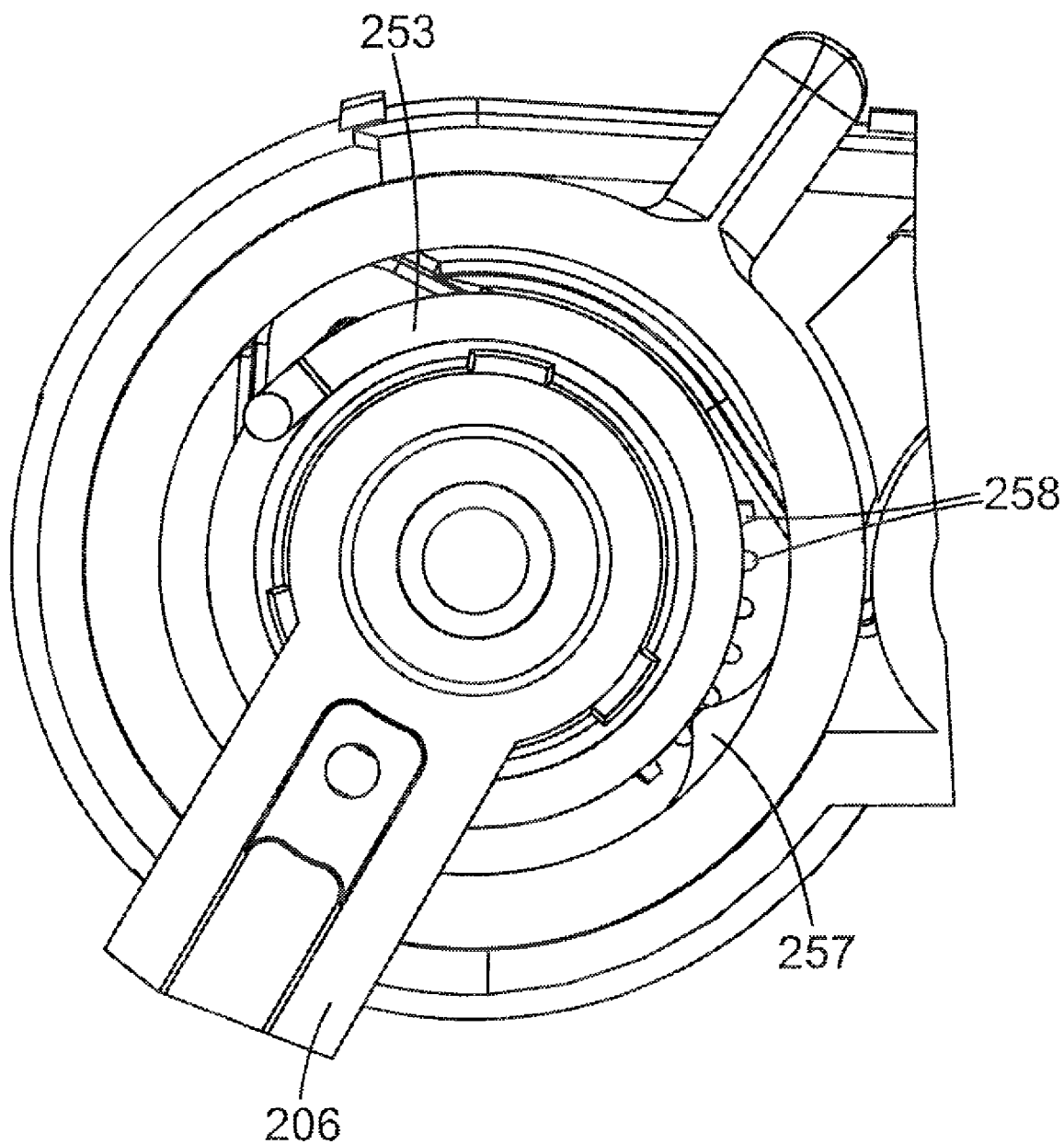
FIG. 7 is a close-up plan view of a portion of the lifter arm assembly.

An exploded view of the lifter linkage is show in FIG. 6 with further details shown in the side view in FIG. 7. In its most basic function, lifter arm 202 in resiliently connected to linkage 206 through a sprint 253, all of which are co-axially aligned along shaft 254. The reason for this arrangement is to allow the depression of the lifter arm 202 and lifter extension member 108 to a point in contact or near contact with sensor plate 136 (see FIG. 2). This downward movement is against the upward bias supplied by the sprint 253. The upward spring bias force needs to be sufficient lift the heaviest receiver handset, yet small enough that downward pressure to the sensor plate 136 will not cause damage to the internal parts.

This flexible link (torsion coupling or bias element) is accomplished by inserting tang of the spring into the tang holes 266 on the linkage 206 and corresponding tang hole 268 on arm 202. The preferred spring is a right hand coil capable of a 400 gram load since most handsets are under 300 grams. The clutch feature is provided by the contact which occurs between opposing pairs of dogs 262 (on linkage 206) and dogs 260 (on arm 202). The optimum angle 264 between leading and trailing edges of consecutive dogs is 70 degrees, though this can vary according many factors. It is however important that arm 202 can be fully depressed to the point that it or the extension 108 encounter a backstop position before encountering direct (non spring) contact between two respective dogs. If this were to occur, as in the case of someone slamming the receiver down upon the lifter extension 108, it is likely that nut 212 would be stripped or other damage could occur.

To control the maximum up and down position of the arm 202 and extension 108, collar 220 is circumferentially interposed coaxially with shaft 254, which can best be seen in FIGS. 1-13. This collar, which becomes a stop-position adjuster, includes a sensor tab 270 which is preferably made reflective (such as with white paint or otherwise) so that sensors 226 and 228, respectively, will measure the reflectivity and thereby sense the presence of tab or flag 270 to delineate the stop positions.

To accomplish this, collar 220 needs to have the ability to be 1) adjustable with respect to arm 202 and 2) secure enough that it will maintain its angular orientation with respect to said arm when the arm is rotating. If it cannot accomplish both functions simultaneously, the upper and lower limits will not be consistently maintained.

Figure 13:
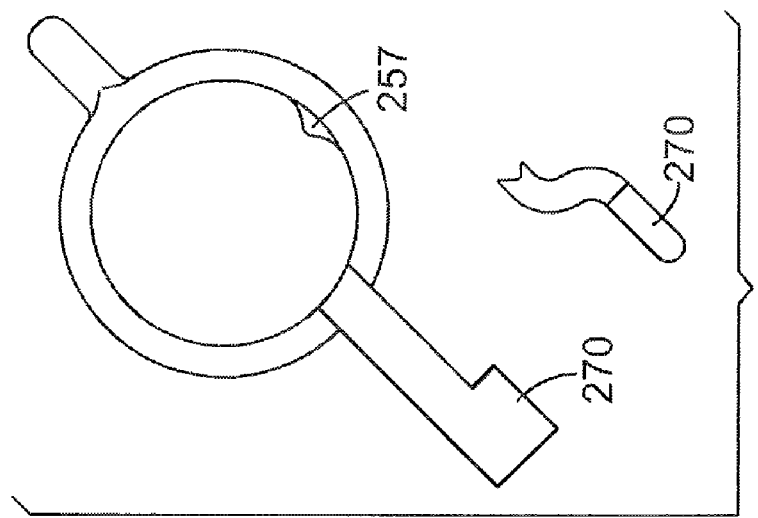
FIG. 13 is a front plan view opposite of FIG. 11.
Figure 12:
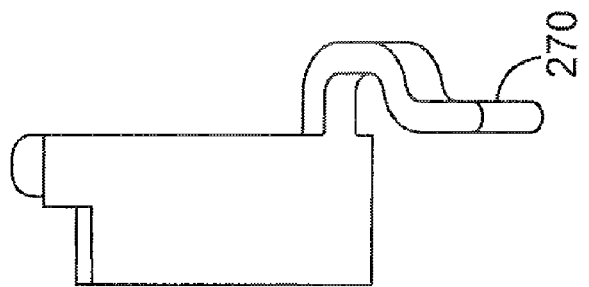
FIG. 12 is a side plan view of the adjuster.
Figure 11:
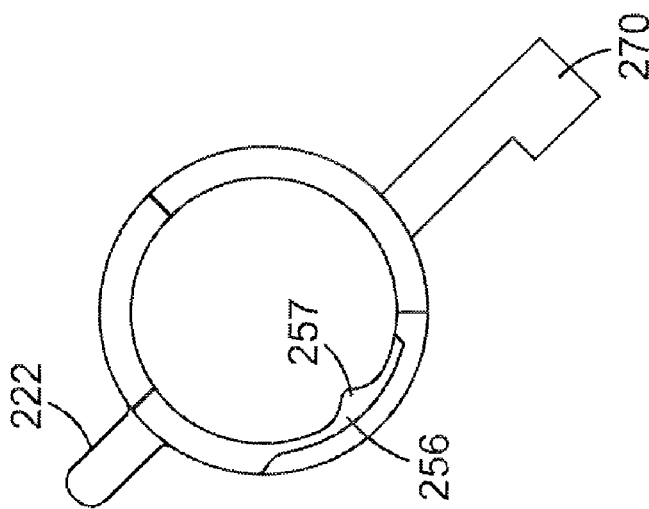
FIG. 11 is a front plan view of the adjuster.

Both functions are achieved by the engagement of detent teeth 272 (see FIG. 16) on arm 202, which mate with detent 257 (see FIGS. 11 and 13). Bias force from detent 257 is provided by spring arm 256 which follows a diameter slightly smaller than a diameter that would be defined by the radially extended detent teeth. This insures that the radially extending detent and teeth are biased toward each and engaged other at all times.

Figure 14:
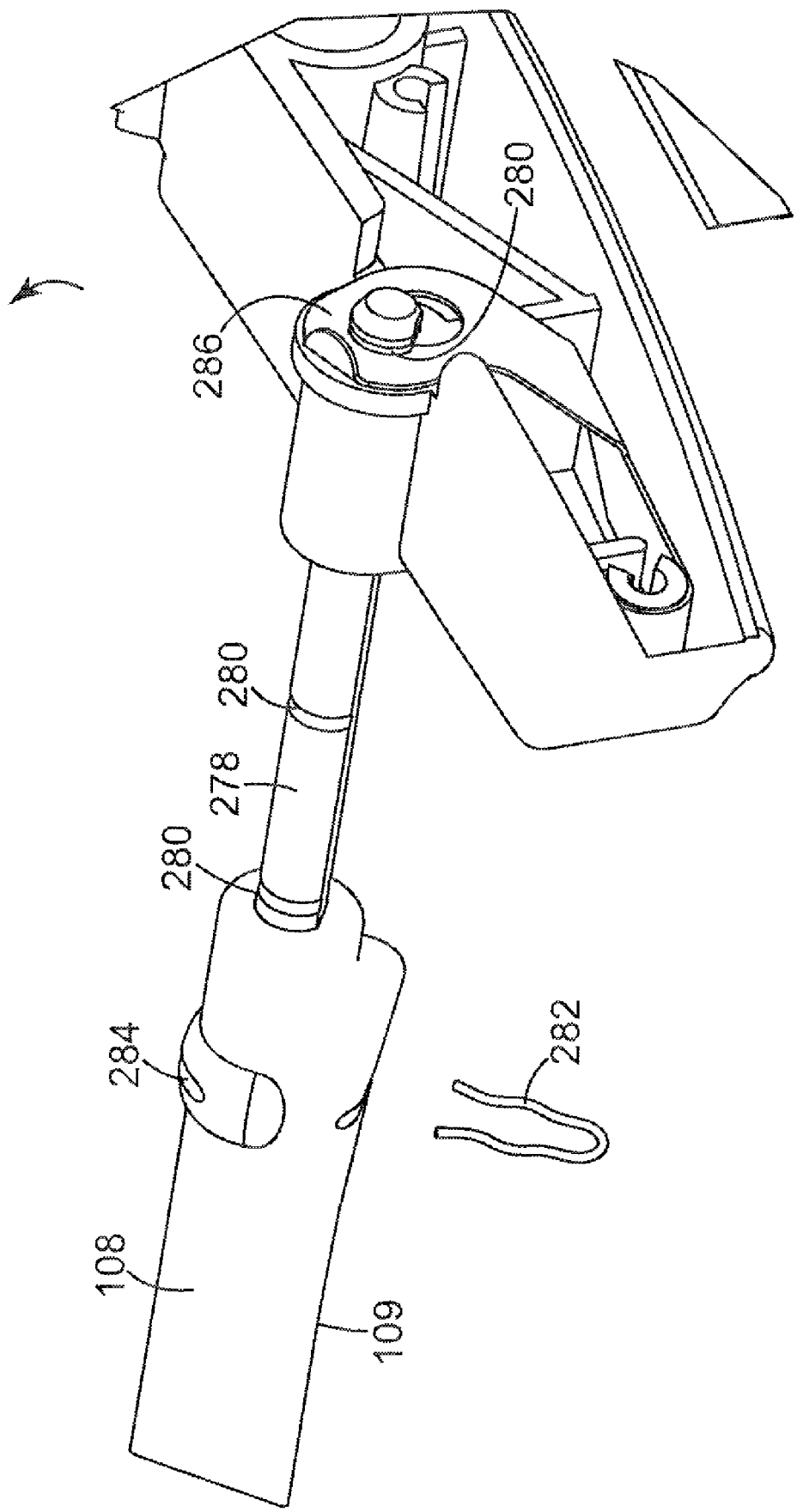
FIG. 14 is a close-up perspective view of the extension arm.

Since this system is intended for using in a large variety of telephone device, whose exact configuration is not known in advance, it is desirable to provide adjustability on the lifter extension 108 (see FIG. 14). Lifter extension 108 is preferably formed with a contact portion 109, usually a somewhat resilient material, having a clip receiving slot 284 for receiving a clip 282 and a shaft 278. The shaft may have a plurality of recesses 280 designed to engage the clip 282 and various points along the shaft. By selecting the appropriate recess, the shaft can be made to extend and be retained at any reasonable length necessary to reside under the handset receiver and be lifted off hook by the movement of arm 202. Extensions of different lengths could be supplied as well by removing the engagement clip 286 which resiliently engages a like recess 280 at the end of the shaft nearest the arm.

Figure 8:
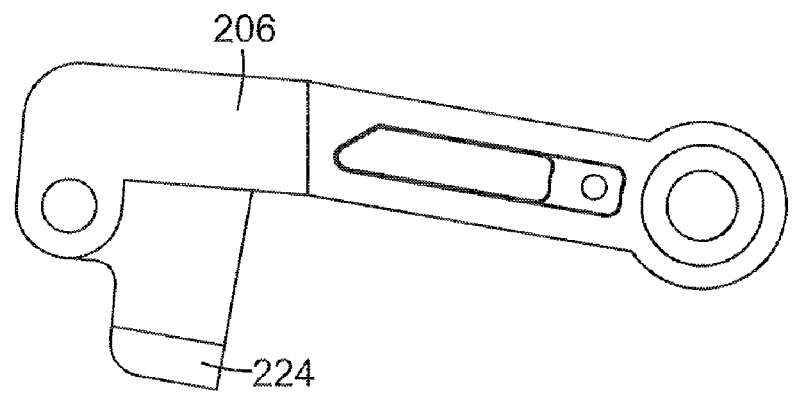
FIG. 8 is a side plan view of the link arm.
Figure 9:
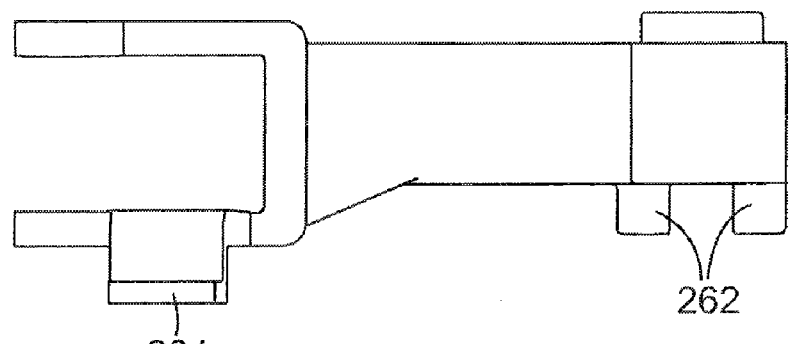
FIG. 9 is a top plan view of the link arm.
Figure 10:
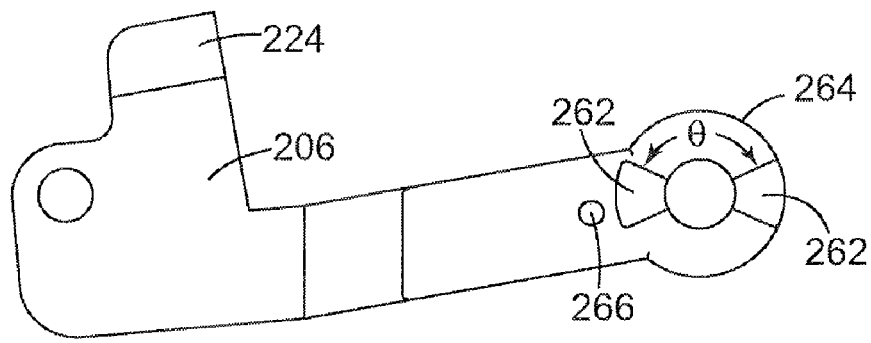
FIG. 10 is a side plan view opposite of FIG. 8.

Reference is now made to FIG. 4-6 with respect to the lifter arm 202 and related assembly and FIGS. 8-10 which show the link arm 206.

To detect an incoming call, the handset lifter 101 includes a sensor preferably magnetic (but may be other types of non-audible field sensor) 230 mounted on the sensing or positioning plate 106. The sensing plate 106 extends over the typical speaker location of the telephone to place the sensor 230 in axial alignment with the telephone speaker. The sensing plate 106 advantageously includes a sensor slot 232 with lands 233 in which the magnetic sensor 230 having recesses 231 sized to functionally engage the lands 237 is slidably deployed. This allows adjustment of the magnetic sensor 230 location to be center over the speaker (or the point of highest field) in order to accommodate a wide variety of telephone configurations. The functional engagement allows for movement without the need for a lock or set screw.

The magnetic sensor 230 can detect the change in magnetic flux of the speaker when the telephone 102 rings. The magnetic sensor 230 is not susceptible to false signals caused by the surroundings, as is a microphone or other vibration sensing device. The magnetic sensor 230 is typically an inductor (e.g. coil). A highly sensitive inductor, such as a hearing aid "T" coil, is preferably used in the magnetic sensor 230. For example, part used in hearing aids. If the phone has some other kind of ring indicator such as an LED (light), the sensor can be optical/photoelectric. Notice that ambient noise does increase the probability of a false pickup since audible sound is not the basis on which the sensor 230 detects a ring. In the rare instance where the telephone set does not use a sound transducer capable of emitting magnetic force, other transducers can be used. To accommodate this, jack 122 (see FIG. 2) is provided so that other remote sensor can be used in place of or in addition to 230. For example, a microphone specifically tuned to detect strong pressure waves of sufficient duration could be employed. Likewise, other EMF sensor can be employed and attached to the phone set at the point of strongest EMF signal during ring tone. Of course, a standard microphone can also be used, if necessary, for example for piezio electric speakers but such a solution will not be capable of distinguishing ambient noise.

In order to insure that the system functions property, it should preferably be calibrated to the type of ringer used in the base telephone. The threshold sensitivity is adjusted by turning the sensitivity potentiometer 124 to indicate a "ring detect" state, by illumination of the LED 126 during a test ring of the base unit. The optimum point will be where the read out (LED) just comes on at 6 dB above the threshold. If the threshold is set too low, there is a risk that hum from the speaker will trigger an off-hook condition.

Figure 15:
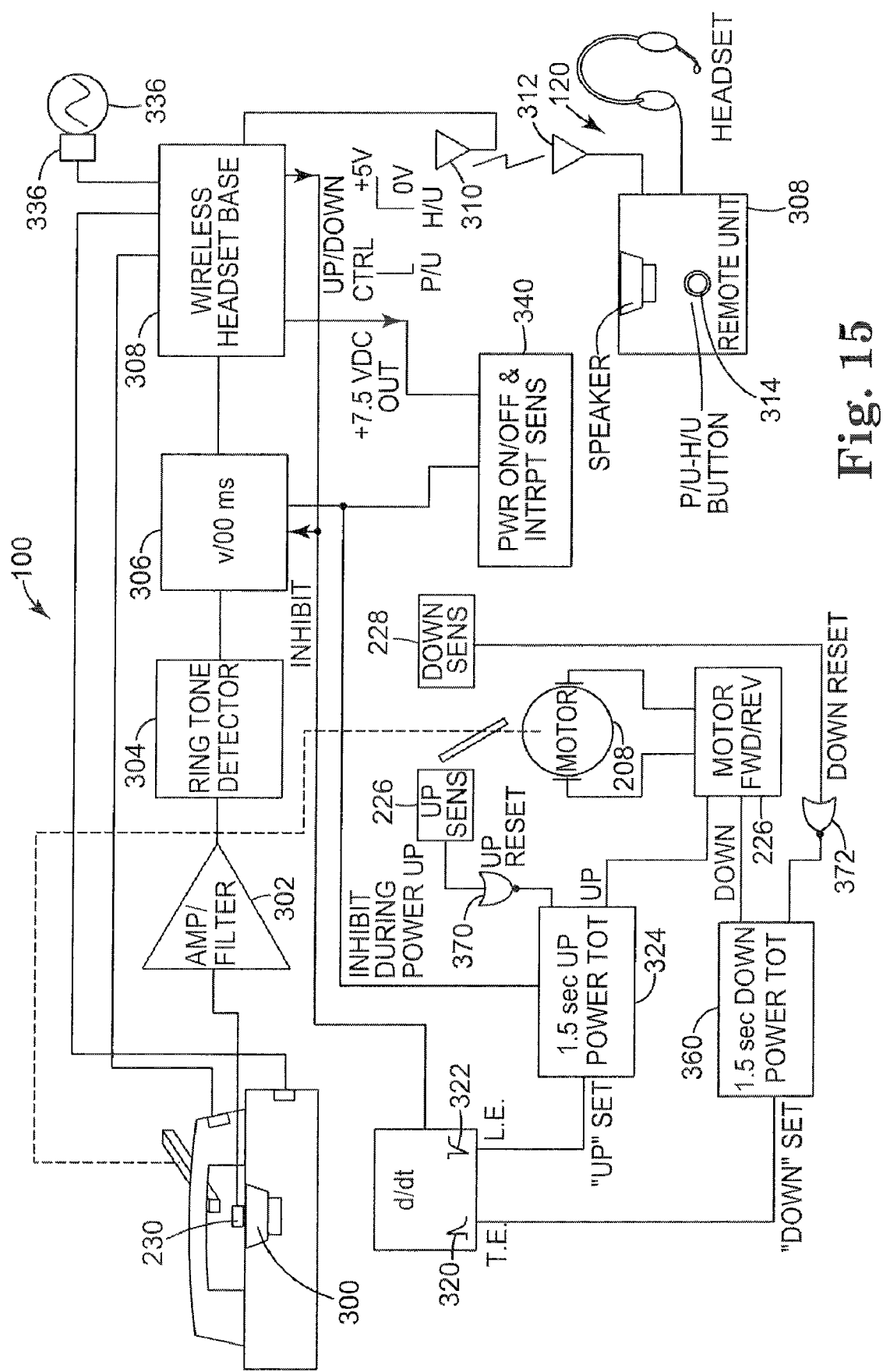
FIG. 15 is a functional block diagram of a system according to an embodiment of the present invention.

Turning now to FIG. 15, a block diagram showing one embodiment of the communications system 100 according to the present invention is illustrated. The magnetic sensor 230 is axially aligned with the telephone speaker 300 or aligned with the strongest EMF. The lifting member 108 is positioned below the handset 110. The lifting member 108 and sensing arm 224 are mechanically coupled to the motor 208, as indicated by the broken line.

The magnetic sensor 230 is connected to an amp/filter 302 for signal conditioning. Typically, amp/filter 302 contains a bandpass filter with cutoffs of approximately −12 dB at 100 Hz and −3 dB at 4500 Hz plus 6 dB/oct rolloff above 700 Hz to flatten coil response. The bandpass filter will attenuate extraneous noise while still amplifying the telephone ringer, which typically has fundamental frequencies between 400 Hz and 2500 Hz. The suggest gain of the amplifier/filter is approximately 76 dB at 4000 Hz. The filter/amp 302 is typically constructed using operational amplifiers (op amps). The design of op amp filters is well known in the art.

The output of the amp/filter 302 is fed into a tone detector 304. The tone detector 304 typically contains an RC circuit with a time constant sufficient to assume minimizing ring tone duration and remove transient spikes from the amp/filter output that could cause false ring detection. The time constant is preferably about 150 ms. The ring tone detector 304 outputs to a one-shot timer 306, typically an LM555 timer or equivalent. The output of the one-shot timer 306 is used to signal the remote communication unit 120 that a ring has been detected. In particular, the one-shot output is fed into a communications module 308.

It is desirable to have the system ignore ring tones of duration less than approximately 120 ms (including ring and quite periods). A typical ring will allow at least 120 ms between the leading edge of one burst to the leading edge of the next succeeding burst. By configuring a system to ignore such time spans less and approx. 120 ms, spurious pulses can be ignored. Typically the ring burst is at least 25 ms with a similar quiet period. It is possible to reduce the minimum time to determine a true ring to approximately 50 or 60 ms. A range of 50-120 ms is also acceptable. For example, a "chirp" indicating voice mail waiting could cause a false trigger in other systems.

The communication module unit 308 deals with communications to/from the remote communication unit 120. In the example of a remote communication unit 120 containing a wireless headset, the communication module unit 308 is a radio transmitter and the signal is sent using antenna 310 and received at remote antenna 312. In other embodiments, the headset base 308 to the remote communication unit 120 can be configured to communicate via other methods, such as wire, fiber optic cable, infrared, etc. and can also be combined into a single unit.

After a ring has been detected by the handset lifter 104, a call received signal is sent from the signal generating circuitry of the communication module 308. Once the remote communication unit 120 receives the call received signal, a response must be sent back to the communication module 308. This can be done automatically (such as with a computer controlled answering device) or by a user. With a wireless headset, the user will typically hear a tone in the headset 124. Other indications given by the remote communication unit 120 could be a flashing light/LED or a vibration device such as those used on pagers or a ringer built into the remote.

Once the remote communication unit 120 has signaled the user, the user will accept or decline to pick up the call. If the user decides to pick up, a pick up signal is sent back to the communications module 308 by remote answering circuitry in the remote unit. This is typically accomplished by the user activating a switch 314 on the remote communications unit 120. The pickup signal is received at the communications module 308 to be processed by the motor control circuits which constitute lifter circuitry.

In the diagram of FIG. 15, the signal for controlling the motor (up/down control) is a step voltage 320 leaving the communications module 308 and sent to a differentiator 322. The step voltage 320 is also sent to the one-shot timer 306 to inhibit the timer 306 from activating while the call is in progress. The differentiator 322 detects the leading edge of the step voltage 320 that signals to pickup the call and sends the signal to the motor up timer 324. The motor-up timer 324 is a resettable LM555 one-shot timer. The timeout value of the motor up timer 324 approximately 4 seconds and the purpose is to switch off the motor in the event of a sensor or mechanical failure.

The motor-up timer 324 sends its output signal to the motor controller 326, causing the motor 208 to raise the lifting member 108. The motor 208 will also move the sensing arm 224 towards the up sensor 226. If the sensing arm 224 activates the up sensor 226 before the motor up timer 324 has timed out, the up sensor 226 will send a reset to the motor up timer 324. The result of the motors up cycle is that the lifting member 108 raises the handset 110 and the telephone's cradle switch is activated, thereby connecting the call.

During the call, the communications module 308 maintains an audio connection with the remote communications unit 120. This connection can be continuous or switched on only during a call. The audio signal is tapped from the audio cable 112 which plugs into the telephone handset jack 303.

It should be noted that additional enhancements are possible with a system according to the present invention to ensure reliability during a call. It is appreciated that, in the event of a power outage, the phone system usually remains operational. The present system may hang up the call if there is a power interrupt, but will not accidentally pick up a call on power interrupt.

To address power outages (among other functions), the base unit 104 includes a power module (not shown). The power module receives power either directly from an AC power source as shown, from a power brick 336 that provides DC voltage. The power module may include a battery for continuing system operation while power is down. The power module may also include voltage regulators and power conditioning circuits as required by the base unit circuitry.

If AC power goes down and then resumes, the system 100 needs to prevent accidental activation of circuits that may be caused by switching transients when transitioning from battery to AC power. To deal with transients, the power module may include a power interrupt sensor 340 that detects a power interrupt. The power interrupt sensor 340 sends out an inhibit signal to the one-shot timer 306 and a motor down timer 360 (to be discussed in greater detail below). The inhibit signal prevents the one-shot timer 306 from sending out an erroneous call received signal.

When the user is ready to terminate the call, a hang up signal is sent from the remote communication unit 120 to the base unit 104. The hang up signal is typically initiated by the user activating the switch 314. The communications module 308 receives the hang up signal and changes the step voltage sent to the differentiator 322. The differentiator 322 detects the trailing edge of the step voltage and activates the motor down timer 360.

The motor down timer 360 sends its output signal to the motor controller 326, causing the motor 208 to lower the lifting member 108. The motor 208 will also move the sensing arm 224 towards the down sensor 228. If the sensing arm 224 activates the down sensor 228 before the motor down timer 360 has timed out, the down sensor 228 will send a reset to the motor down timer 326. The result of the motor's down cycle is that the lifting member 108 lowers the handset 110 and the cradle switch is deactivated, thereby disconnecting the call.

The motor control circuits contain NOR gates 370, 372 connected between the reset pin of up/down timers 324, 360 and the up/down limit sensors 226, 228. The NOR gates 370, 372 take inputs from both the limit sensors 226, 228 and from the output of the opposing timer 360, 324. In this way, the timers 324, 360 are inhibited if either the associated limit sensor 226, 228 is activated or the opposing timer 360, 324 is activated. The NOR gates 370, 372 help ensure that the motor controller 326 does not receive conflicting signals from the up/down timers 324, 360, i.e. the up or down action must complete before it can be reversed by disabling the opposite function until the first function is complete.

Figure 16:
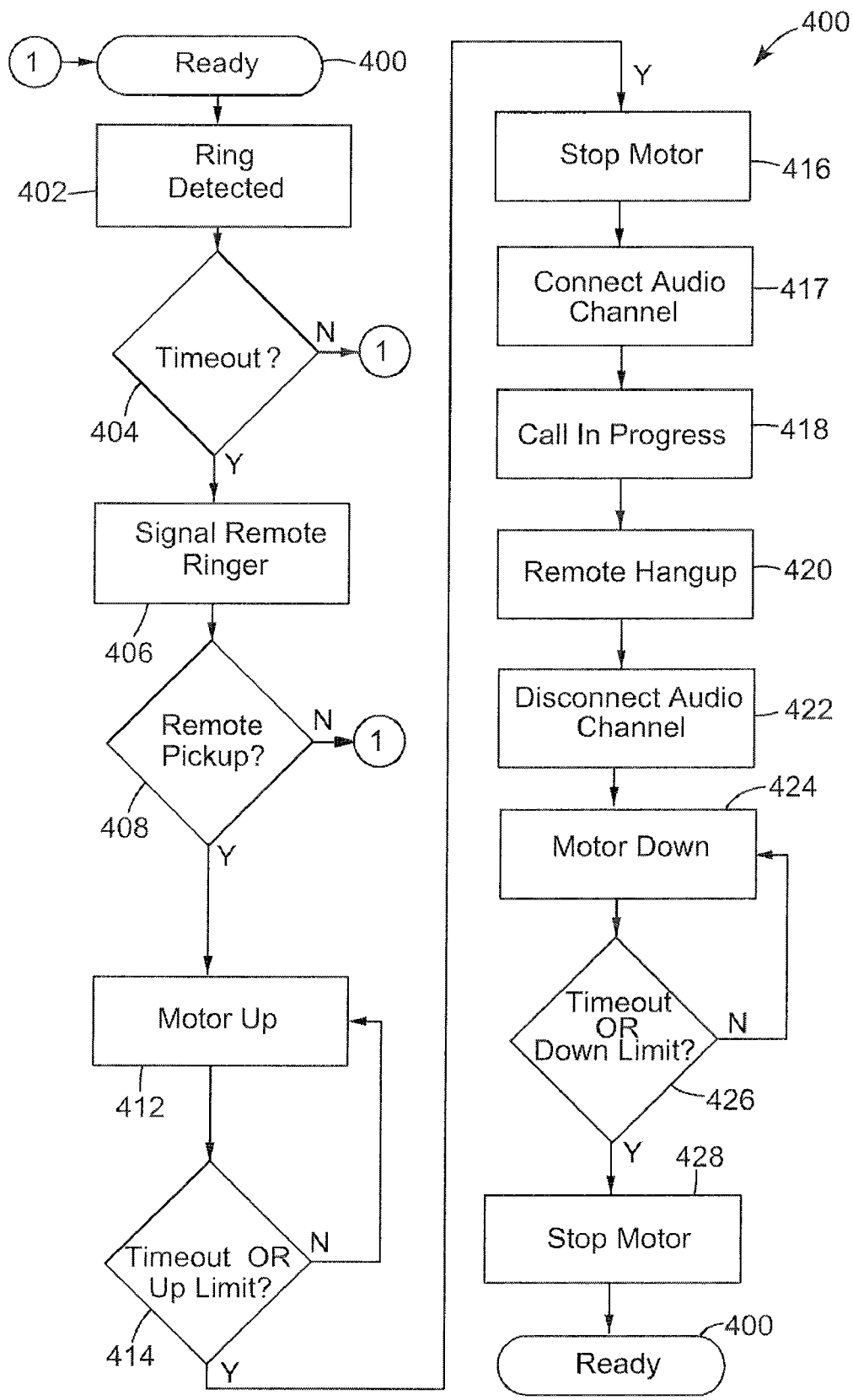
FIG. 16 is a flowchart illustrating a procedure for remote answering of a telephone according to an embodiment of the present invention.

Turning now to FIG. 16, a procedural flowchart 400 demonstrates the steps followed by a system according to the present invention in processing an incoming call. The procedure begins at a ready step 401 waiting for a call. Ring signal detection step 402 occurs when a filtered output is received from the magnetic sensor 220. A timeout step 404 is used to decide whether the ring detected is an actual ring signal. If the timeout step 404 runs to completion (typical time 4 seconds), the remote communication unit 120 is signaled at step 406.

If the remote communication unit 120 returns the pickup signal (e.g. if operator presses button 314). The motor up circuit starts at step 412 and continues running the motor 208 up until decision block 414 exits with a timeout or signal from up limit sensor 226. After decision block 414 exits, the motor is stopped at step 416. At step 417, the audio channel is connected. Alternatively, it is possible that the audio channel is connected during the entire procedure 400, in which case step 417 is skipped. At step 418, the call is in progress.

The user issues a remote hang up via the remote communication unit 120 at step 420. The communications module 308 optionally disconnects the audio channel at step 422. The motor down circuit starts at step 424 and continues running the motor 208 down until decision block 426 exits with a timeout or signal from down limit sensor 228. After decision block 426 exits, the motor is stopped at step 428. The system finally exits by returning to the ready state 400.

Figure 17:
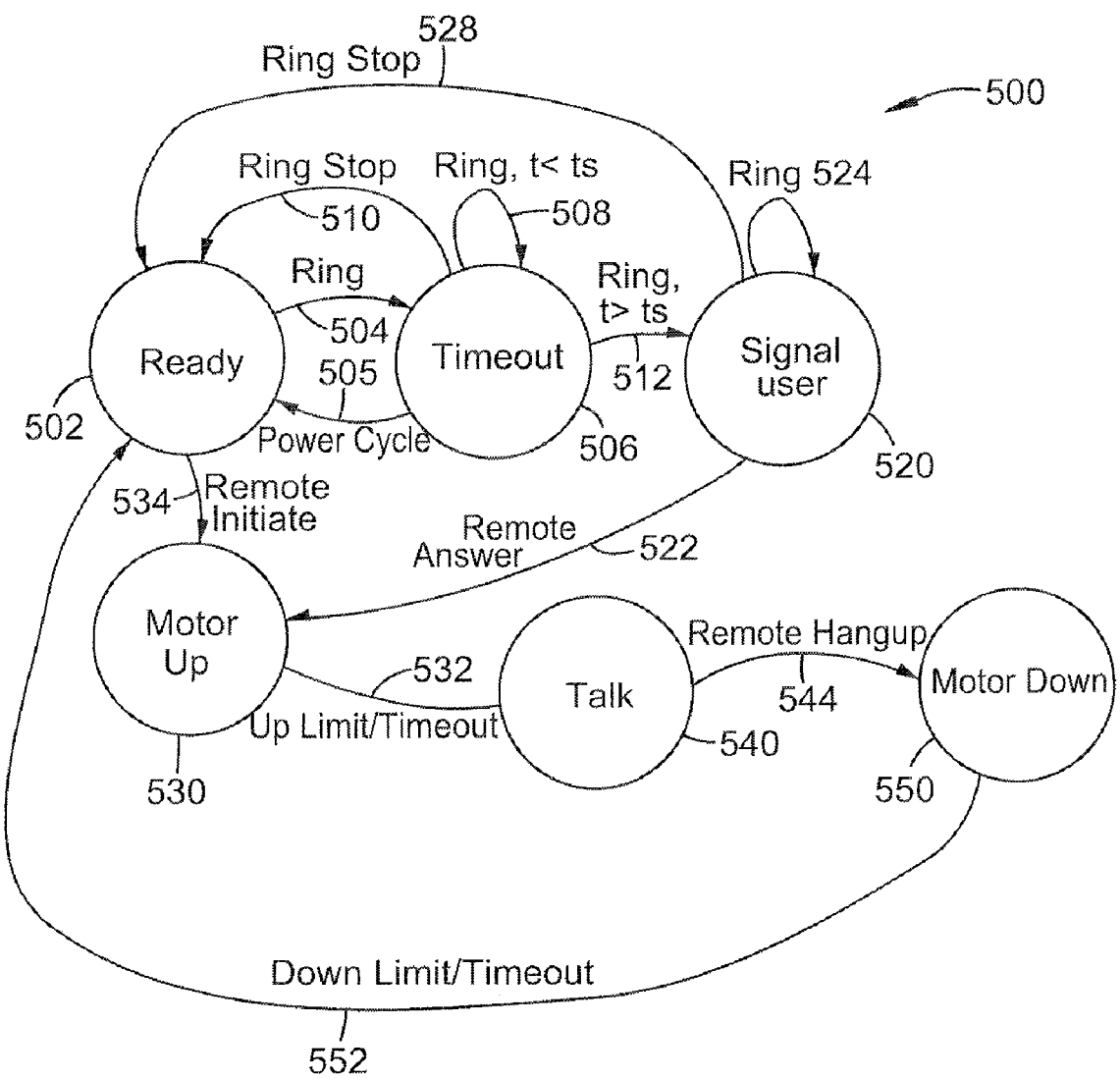
FIG. 17 is a state diagram illustrating system states for remote answering of a telephone according to an embodiment of the present invention While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

Turning now to FIG. 17, a finite state diagram 500 is shown illustrating behavior of a system 100 according to the present invention. The system 100 starts in a ready state 502. When a ring 504 is received, it moves to a ring timeout state 506 to determine if the ring has sufficient sustain time, $t_s$. While the ring continues but time is less than $t_s$ (event 508), the system remains in state 506. If the ring stops 510, the system goes back to ready state 502. If the ring continues for longer than $t_s$, (event 512), the system 100 goes to signal user state 520.

The signal user state 520 is a wait state, waiting for a remote answer event 522. While waiting, ring event and power cycle events 524, 526 will not cause a state change. However, a ring stop event 528 will return the system 100 to the ready state 502.

The system 100 transitions from the signal user state 520 to a motor up state 530 upon receiving the remote answer event 522. The system 100 stays in the motor up state 530 until an up limit/timeout event 532 occurs, and then the system 100 transitions to the talk state 540. When the remote communications unit 120 signals a remote hang-up event 544, the system 100 transitions to a motor down state 550. The system 100 stays in the motor down state 550 until a down limit/timeout event 552 occurs, and the system returns to the ready state 502.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A base unit apparatus affixable to a telephone set, for lifting a telephone handset, the telephone set having a speaker, the base unit apparatus comprising:
    a sensing plate having an aperture:
    a magnetic coil sildeably disposed in the aperture of the sensing plate, the magnetic coil movable so it can be placed in approximate in axial alignment with the speaker to detect electromagnet flux - from a ring signal of the speaker; a lifting arm movably attached to the base unit, the lifting arm including a lifting member extending over a top surface of the sensing plate, the lifting arm movable so that at least the lifting member is movable substantially upwards from the sensing plate; said sensing plate includes an adjuster capable of receiving said coil for slideable alignment with the speaker;
    a drive connected to the lifting arm, an actuation of the drive initiating a movement of the lifting arm; and
    a control circuit coupled to the magnetic coil and the motor to automatically move the lifting arm upon the detection of the ring signal.

2. The base unit of claim 1 wherein the adjuster includes an elongated channel and wherein said coil is sildeably positioned in said channel.

3. A base unit apparatus for lifting a telephone handset of a telephone set having a speaker, the base unit apparatus comprising:
    a sensing plate having a void;
    a magnetic coil movable so it can be placed in approximate in axial alignment with the speaker to detect EMF from a ring signal of the speaker; a lifting arm movably attached to the base unit, the lifting arm including a lifting member extending over a top surface of the sensing plate, the lifting arm movable so that at least the lifting member is movable substantially upwards from the sensing plate;
    a drive connected to the lifting arm, an actuation of the drive initiating a movement of the lifting arm; and
    a control circuit coupled to the magnetic coil and the motor to automatically move the lifting arm upon the detection of the ring signal and, wherein the control circuit further comprises a calibration circuit having a adjuster and a readout, the adjuster providing a sensitivity adjustment of the magnetic detector so that the readout gives an indication of the ring of the speaker being detected.

4. The base unit of claim 3 wherein said control circuit controls upward and downward movement of the lifting arm and further includes circuitry for preventing the initiation of an instruction to reverse the direction of the movement until the arm has traveled completely to its upwardmost or downwardmost position.

5. A base unit apparatus for lifting a telephone handset of a telephone set having a speaker, the base unit apparatus comprising:
    a sensing plate having a void;
    a magnetic coil movable so it can be placed in approximate in axial alignment with the speaker to detect EMF from a ring signal of the speaker; a lifting arm movably attached to the base unit, the lifting arm including a lifting member extending over a top surface of the sensing plate, the lifting arm movable so that at least the lifting member is movable substantially upwards from the sensing plate;
    a drive connected to the lifting arm, an actuation of the drive initiating a movement of the lifting arm; and
    a control circuit coupled to the magnetic coil and the motor to automatically move the lifting arm upon the detection of the ring signal, and wherein the lifting arm comprises a sensing arm member and a travel limit, the sensing arm member movable proximate the at least one limit sensor at the travel limit of the lifting arm.

6. The base unit of claim 5, wherein the sensing arm member is movably adjustable relative to the lifting arm thereby allowing adjustment of the travel limit.

7. The base unit of claim 5 wherein said control circuit further includes circuitry for preventing the control circuit from responding to a ring detect condition when the lifting arm has completed movement from one position to the other.

8. A non-audible method of detecting a telephone ring made by a ring-sound transducer of the telephone, the method comprising; locating a non-audio sensor proximate the transducer capable of receiving, fields generated by said transducer, slidably positioning an EMF sensor generally proximate the transducer along a path provided to accommodate variations in the position of the transducer on the telephone, sensing a variation in such produced waves emanating from the transducer to detect a potential ring signal;

timing the sensed variation in the field to measure the time from the start of one ring pulse to the next ring pulse of the potential ring signal; and initiating a ring detected signal greater than a predetermined value.

9. The method of claim 8 wherein said slideably position step includes providing an elongated channel and a sensor therein so that the sensor may be slideably positioned anywhere in that channel.

* * * * *